Oct. 31, 1933.  A. SCHADE  1,932,680

METHOD AND APPARATUS FOR FEEDING SHEETS

Filed Jan. 28, 1932  2 Sheets-Sheet 1

INVENTOR
Arthur Schade
BY
Wm. S. Pritchard
ATTORNEY

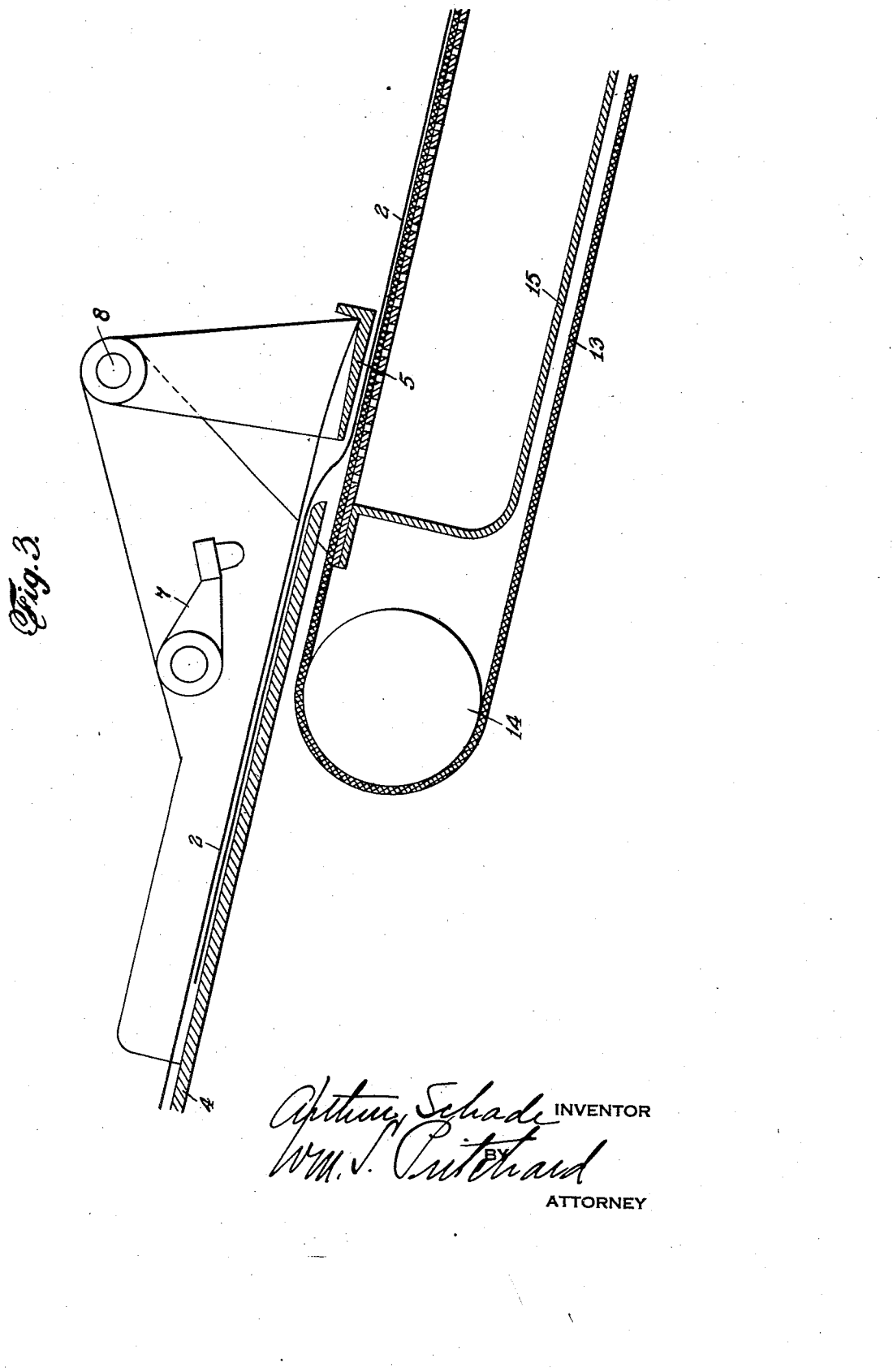

Patented Oct. 31, 1933

1,932,680

UNITED STATES PATENT OFFICE 1,932,680

METHOD AND APPARATUS FOR FEEDING SHEETS

Arthur Schade, Wiesbaden-Biebrich, Germany, assignor to Kalle & Co. Aktiengesellschaft, Wiesbaden-Biebrich, Germany, a corporation of Germany Application January 28, 1932, Serial No. 589,340, and in Germany February 4, 1931

18 Claims. (Cl. 271—48)

This invention relates to a sheet-feeding device which properly positions and aligns the sheets so that they may be uniformly fed in the proper position to the desired mechanism, such as a pair of rollers which may perform or aid in performing the desired operation, for example, embossing, gluing and laminating.

Many devices have been designed to feed sheets to any desired position to be worked up on machines and to conduct them to these machines. However, up to the present time no apparatus has been devised for conveying sheets in precise sequence and uniform relationship with respect to each other to a suitable mechanism, such as a pair of rollers, for the purpose of embossing, gluing, laminating, etc. The feeding devices employed prior to this invention were defective in that they did not prevent, and frequently occasioned, the formation of creases or folds in the sheets with the consequence that the subsequent operation produced products of an inferior grade.

I have found that by properly positioning the individual sheets prior to the disposition thereof on a conveyor by a mechanism more fully explained hereafter and then transferring the sheets to the conveyor, which is constructed to maintain the sheets in the deposited position thereon and convey them to the machine, such as a pair of rollers, at a speed less than the peripheral speed of said rollers, the above-mentioned defects may be overcome.

It is therefore an object of this invention to provide a method and apparatus for uniformly feeding sheets in precise sequence to a machine without causing any creases in said sheets.

Another object of this invention is to provide an apparatus to feed sheets in precise sequence and uniform relationship with respect to each other comprising a conveyor to convey the sheets of material to the desired mechanism, means to position each sheet prior to the disposition on the conveyor, and means to maintain the sheets in position while they are being transferred to said conveyor.

A further object of this invention is to provide an apparatus for uniformly feeding sheets in proper position and uniform sequence to a pair of rollers comprising a movable ledge cooperating with the sheets of material fed thereto to position the same, means to hold the sheets in position and release them when the ledge is moved out of contact with said sheets, and a conveyor to receive the sheets as they disengage the ledge and convey them to the rollers upon release by the holding means.

Other objects will become apparent from the following description, appended claims and accompanying drawings forming a part of this specification and in which:

Figure 1 designates a diagrammatic side elevation illustrating the mechanism constituting the instant invention.

Figure 3 illustrates the mechanism at one stage of its operation.

Figure 1:
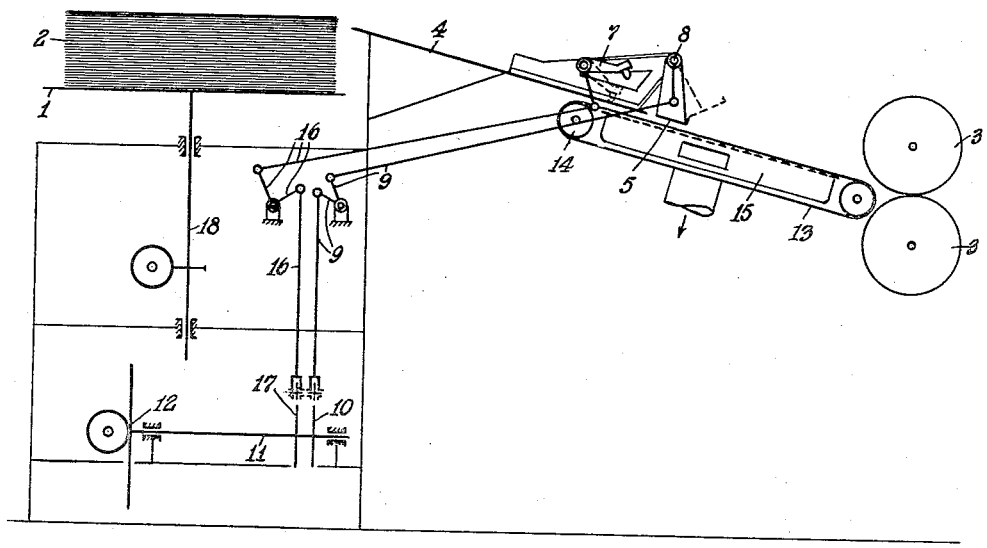
Figure 2:
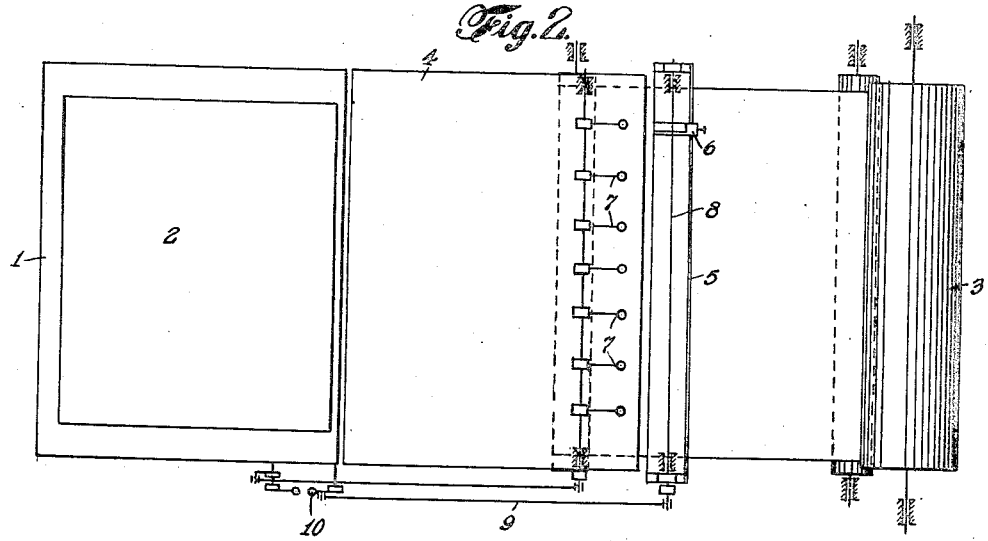
Figure 2 is a top plan view of the device illustrated in Figure 1.

Referring now to the drawings wherein like reference numerals designate like parts, the reference numeral 1 designates a table on which the sheets 2 to be fed to the rollers 3 are positioned. Adjacent the table 1 there is disposed a shelf 4 over which the sheets are fed until the front edges thereof are received on the ledge 5 normally disposed adjacent one extremity of the shelf 4. In the preferred embodiment of the invention, the ledge 5 is provided with an adjustable guide 6 which is adapted to cooperate with the longitudinal edges of the sheets. By means of the front edge of the ledge 5 and the guide 6, the sheets are properly positioned and aligned.

After a sheet is positioned as just described, it is held in position by means of a finger 7 or plurality thereof arranged in spaced relationship and exerting pressure on a portion of the sheet still remaining on the shelf 4.

The ledge 5 is pivotally mounted on the shaft 8 about which it is adapted to be intermittently oscillated through a linkage 9 actuated by any suitable mechanism, such as an eccentric or cam disc 10 mounted on a shaft 11 which is driven from any source of supply in any suitable manner, such as through a friction drive 12.

In accordance with this invention, after a sheet 2 has been positioned on the ledge 5 and held in position by the finger 7, the ledge 5 is moved in an arc about the shaft 8 through the linkage 9 and its appurtenant elements until the forward edge of the sheet is disengaged. Upon disengagement, the forward end of the sheet drops on to a conveyor 13 mounted beneath the ledge 5.

The conveyor 13 may be of the endless type and in the form illustrated consists of an endless belt made of a pervious material and trained over pulleys 14. In order to secure and grip the sheets in their deposited position on the conveyor, the upper run of the conveyor is caused to pass over a vacuum box 15, whereby the sheets are secured and held in position. It is, of course, obvious that the vacuum means for holding the sheets on the conveyor are merely illustrative and that other means may be used without departing from the spirit of the invention.

The finger 7, as previously described, holds the sheet in position until it is free from the ledge. By means of a linkage 16 operated by an eccentric or cam disc 17 mounted on the shaft 11 and operated through the friction drive 12, the finger is raised and caused to release the sheet when the ledge has disengaged the sheet. The conveyor 13 having gripped the forward portion of the sheet draws the sheet from the shelf and grips it throughout its surface, and in this manner conveys it to the rollers 3 which perform the desired operation or feed it to the mechanism for accomplishing the desired result.

By suitable design of the linkages 9, 16 and their respective actuating mechanisms, the successive operations of the ledge 5 and the finger 7 may be readily secured. It is to be noted that, after the sheet has been deposited on the conveyor as described, the ledge 5 is oscillated in a direction opposite to its first movement and brought back into position to receive and align the next sheet fed thereto. During this operation the finger 7 remains in the raised position.

In the drawings the table 1 is shown as being mounted in a horizontally plane and adjustably mounted on a screw member 18, whereby the level of the table may be adjusted vertically as desired. The shelf 4 and the feeding mechanism in the drawings are shown as being inclined at an angle to the table 1. The invention is not restricted to this precise arrangement, since it is apparent that the shelf and the feeding mechanism may be positioned horizontally.

The sheets 2 may be manually fed from the stack on the table to the positioning device. However, it is within the purview of this invention to feed the sheets by some mechanical means, such as rollers, pickers or the like.

Instead of the finger 7 being adapted to hold the sheets in position by means of pressing the same against the shelf 4, it may be so designed that the desired function can be accomplished by a vacuum. According to this form of the invention, the finger could be disposed above or below the sheets and by means of suitable control mechanisms the vacuum could be automatically made and relieved at predetermined intervals.

When the sheets are fed by the conveyor 13 to the rollers 3, it is preferred that the speed of the conveyor belt be less than the peripheral speed of the roller so that, as soon as the rollers have gripped the sheets, they may draw the same from the belt. This action serves not only to stretch the sheets and remove wrinkles therefrom but also to prevent the formation of wrinkles in the sheets during the transfer from the conveyor to said rollers.

By regulating and controlling the rate of feeding of the sheets to the aligning and positioning device, the sheets may be fed to the rollers 3 in a uniformly spaced or overlapping condition as desired.

Since it is obvious that various changes may be made in the specific details hereinbefore set forth, the invention is not restricted thereto except as defined in the appended claims.

I claim:

1. An apparatus of the class described comprising a pair of rollers, a conveyor to convey sheets of material to said rollers, means to position at least the front edge of each sheet prior to disposition on said conveyor, means to hold the sheet in position after positioning and while it is being transferred to said conveyor, and means to release the sheet-holding means whereby the sheet may be completely transferred to said conveyor.

2. An apparatus of the class described comprising a pair of rollers, a conveyor traveling at a speed less than the peripheral speed of said rollers and conveying to said rollers sheets of material arranged in predetermined relationship with respect to each other, means to position each sheet prior to the disposition on said conveyor, and means to maintain the sheet in position during its transfer to the conveyor.

3. An apparatus of the class described comprising a pair of rollers, a ledge cooperating with a sheet of material fed thereto to properly position said sheet, means to hold the sheet in position, means to move said ledge out of contact with said sheet, a conveyor to receive the front portion of the sheet when the ledge disengages it, and means to operate the holding means to release the sheet after the ledge has disengaged it, whereby said sheet may be completely disposed on the conveyor and transferred to said rollers.

4. An apparatus of the class described comprising a ledge cooperating with side and front edges of a sheet of material fed thereto to position said sheet, means to hold the sheet in position, means to move the ledge out of contact with said sheet, a conveyor to receive the sheet when the ledge disengages it, means to operate the holding means to cause it to release the sheet, and a pair of rollers to which the sheet is conveyed by said conveyor.

5. An apparatus of the class described comprising a ledge cooperating with side and front edges of a sheet of material fed thereto to position said sheet, means to hold the sheet in position, means to move the ledge out of contact with said sheet, a conveyor to receive the sheet when the ledge disengages it, means to operate the holding means to cause it to release the sheet, and a pair of rollers to which the sheet is conveyed by said conveyor, the peripheral speed of the rollers being greater than the speed of the conveyor.

6. An apparatus of the class described comprising a ledge cooperating with a sheet of material fed thereto to properly position said sheet, means to hold the sheet in position, means to move said ledge out of contact with said sheet, a conveyor to receive the sheet when the ledge disengages it, said conveyor being provided with means to maintain the sheet in the position delivered thereto, and means to operate the holding means to release the sheet after the ledge has disengaged it, whereby the conveyor may transfer the sheet to the desired mechanism.

7. An apparatus of the class described comprising a ledge cooperating with the side and front edges of a sheet of material fed thereto to position said sheet, means to hold the sheet in position, means to move the ledge out of contact with said sheet, a conveyor to receive the sheet when the ledge disengages it, said conveyor being provided with means to maintain the sheet in the position delivered thereto, means to operate the holding means to cause it to release the sheet, and a pair of rollers to which the sheet is conveyed by said conveyor.

8. An apparatus of the class described comprising a ledge cooperating with the side and front edges of a sheet of material fed thereto to position said sheet, means to hold the sheet in position, means to move the ledge out of contact with said sheet, a conveyor to receive the sheet when the ledge disengages it, said conveyor being provided with means to maintain the sheet in the position delivered thereto, means to operate the holding means to cause it to release the sheet, and a pair of rollers to which the sheet is conveyed by said conveyor, the peripheral speed of the rollers being greater than the speed of the conveyor.

9. An apparatus of the class described comprising a pair of rollers, a conveyor traveling at a speed less than the peripheral speed of said rollers and conveying to said rollers sheets of material arranged in predetermined relationship with respect to each other, means to position the front edge of each sheet prior to the disposition on said conveyor, and means to maintain the sheet in position during its transfer to the conveyor.

10. An apparatus of the class described comprising a pair of rollers, a conveyor traveling at a speed less than the peripheral speed of said rollers and conveying to said rollers sheets of material arranged in predetermined relationship with respect to each other, means to position the front and side edges of each sheet prior to the disposition on said conveyor, and means to maintain the sheet in position during its transfer to the conveyor.

11. An apparatus of the class described comprising a shelf over which sheets are fed from the source of supply, a conveyor to convey the sheets in positions delivered thereto to the desired mechanism, means disposed adjacent said shelf to position each sheet prior to disposition thereof on said conveyor, means cooperating with said shelf to hold the sheets in position after positioning and while they are being transferred to said conveyor, and means to release the holding means whereby the sheets may be completely transferred to the conveyor and conveyed to the desired mechanism.

12. An apparatus of the class described comprising a shelf over which sheets are fed from the source of supply, a conveyor to convey the sheets in positions delivered thereto to the desired mechanism, a ledge adjacent said shelf and adapted to cooperate with the front edge of each sheet to position the same prior to the disposition thereof on said conveyor, means cooperating with said shelf to hold the sheet in position after positioning by said ledge and while it is being transferred to said conveyor, means to move the ledge out of cooperative relationship with said shelf whereby the forward portion of the sheet is transferred to said conveyor, and means to release the holding means whereby the sheet may be completely transferred to the conveyor and conveyed to the desired mechanism.

13. An apparatus of the class described comprising a shelf over which sheets are fed from the source of supply, a pair of rollers, a conveyor to convey the sheets in positions delivered thereto to the said rollers, a ledge adjacent said shelf and adapted to cooperate with the front edge of each sheet to position the same prior to disposition thereof on said conveyor, means cooperating with said shelf to hold the sheet in position after positioning and while it is being transferred to said conveyor, means to move the ledge out of cooperative relationship with said sheet whereby the forward portion of said sheet is transferred to said conveyor, and means to release the holding means whereby the sheet may be completely transferred to the conveyor and conveyed to said rollers.

14. An apparatus of the class described comprising a shelf over which sheets are fed from the source of supply, a pair of rollers, a conveyor to convey the sheets in positions delivered thereto to the said rollers, a ledge adjacent said shelf and adapted to cooperate with the front edge of each sheet to position the same prior to disposition thereof on said conveyor, means cooperating with said shelf to hold the sheet in position after positioning and while it is being transferred to said conveyor, means to move the ledge out of cooperative relationship with said sheet whereby the forward portion of said sheet is transferred to said conveyor, and means to release the holding means whereby the sheet may be completely transferred to the conveyor and conveyed to said rollers, the peripheral speed of the rollers being greater than the speed of the conveyor.

15. An apparatus of the class described comprising a shelf over which sheets are fed from the source of supply, a pair of rollers, a conveyor to convey the sheets in positions delivered thereto to the said rollers, a ledge adjacent said shelf and adapted to cooperate with the front and side edges of each sheet to position the same prior to disposition thereof on said conveyor, means cooperating with said shelf to hold the sheet in position after positioning and while it is being transferred to said conveyor, means to move the ledge out of cooperative relationship with said sheet whereby the forward portion of said sheet is transferred to said conveyor, and means to release the holding means whereby the sheet may be completely transferred to the conveyor and conveyed to said rollers.

16. An apparatus of the class described comprising a shelf over which sheets are fed from the source of supply, a pair of rollers, a conveyor to convey the sheets in positions delivered thereto to the said rollers, a ledge adjacent said shelf and adapted to cooperate with the front and side edges of each sheet to position the same prior to disposition thereof on said conveyor, means cooperating with said shelf to hold the sheet in position after positioning and while it is being transferred to said conveyor, means to move the ledge out of cooperative relationship with said sheet whereby the forward portion of said sheet is transferred to said conveyor, and means to release the holding means whereby the sheet may be completely transferred to the conveyor and conveyed to said rollers, the peripheral speed of the rollers being greater than the speed of the conveyor.

17. A method of feeding sheets in uniform succession to a pair of rollers for the purpose of gluing, embossing, laminating, etc., which comprises positioning each sheet by causing the front portion thereof to contact with a ledge, holding the sheet in position after it has been positioned and while the ledge is removed out of cooperative relationship with said sheet whereby the forward portion of said sheet is transferred to a conveying mechanism, releasing the sheet whereby it may be completely transferred to the conveyor, and conveying it to the rollers.

18. A method of feeding sheets in uniform succession to a pair of rollers for the purpose of gluing, embossing, laminating, etc., which comprises positioning each sheet by causing the front portion thereof to contact with a ledge, holding the sheet in position after it has been positioned and while the ledge is removed out of cooperative relationship with said sheet whereby the forward portion of said sheet is transferred to a conveying mechanism, releasing the sheet whereby it may be completely transferred to the conveyor, and conveying it to the rollers, the peripheral speed of the rollers being greater than the speed of the conveyor.

ARTHUR SCHADE.